US012623918B2

(12) United States Patent
Lv et al.

(10) Patent No.: US 12,623,918 B2
(45) Date of Patent: May 12, 2026

(54) COMPOSITE SODIUM FERROUS SULFATE CATHODE MATERIAL, AND PREPARATION METHOD AND APPLICATION THEREOF

(71) Applicant: HUBEI WANRUN NEW ENERGY TECHNOLOGY CO., LTD., Shiyan (CN)

(72) Inventors: Fei Lv, Shiyan (CN); Kai Gao, Shiyan (CN); Qin Wang, Shiyan (CN)

(73) Assignee: HUBEI WANRUN NEW ENERGY TECHNOLOGY CO., LTD., Shiyan (CN)

(*) Notice: Subject to any disclaimer, the term of this patent is extended or adjusted under 35 U.S.C. 154(b) by 55 days.

(21) Appl. No.: 18/870,387

(22) PCT Filed: Sep. 10, 2024

(86) PCT No.: PCT/CN2024/118066
§ 371 (c)(1),
(2) Date: Nov. 28, 2024

(87) PCT Pub. No.: WO2026/044824
PCT Pub. Date: Mar. 5, 2026

(65) Prior Publication Data
US 2026/0062310 A1 Mar. 5, 2026

(51) Int. Cl.
*C01G 49/00* (2006.01)
*H01M 10/054* (2010.01)

(52) U.S. Cl.
CPC ........ *C01G 49/009* (2013.01); *H01M 10/054* (2013.01); *C01P 2002/54* (2013.01);
(Continued)

(58) Field of Classification Search
CPC ............................ C01G 49/009; H01M 10/054
See application file for complete search history.

(56) References Cited

U.S. PATENT DOCUMENTS

2021/0184209 A1 6/2021 Liu

FOREIGN PATENT DOCUMENTS

CN 115050957 A 9/2022
CN 115863570 A 3/2023
(Continued)

OTHER PUBLICATIONS

Rachid Essehli, Alaa Alkhateeb, Abdelfattah Mahmoud, Frederic Boschini, Hamdi Ben Yahia, Ruhul Amin, Ilias Belharouak, "Optimization of the compositions of polyanionic sodium-ion battery cathode NaFe2-xVx(PO4)(SO4)2", Journal of Power Sources, vol. 469, 2020 (Year: 2020).*
(Continued)

*Primary Examiner* — Barbara L Gilliam
*Assistant Examiner* — Benjamin T Lustgraaf
(74) *Attorney, Agent, or Firm* — The Sun IP Law

(57) ABSTRACT

The present disclosure belongs to the field of sodium batteries. Provided are a composite sodium ferrous sulfate cathode material, and a preparation method and application thereof. The composite sodium ferrous sulfate cathode material includes a core. A chemical formula of the core is $Na_xM_yFe_z(PO_4)_k(SO_4)_{(0.4-0.6)x}O_t$, where M includes at least one of manganese, vanadium, or titanium, $16 \le x \le 17$, $y=1$, $4 \le z \le 5$, $2 \le k \le 2.6$, and $y+z-0.1x-1.5k \le t \le y+z+0.1x-1.5k$. According to the present disclosure, sulfate decomposition is reduced, the material performance of the composite sodium ferrous sulfate cathode material is improved, and a secondary battery using the composite sodium ferrous sulfate cathode material is improved in terms of performance such as cycling performance.

16 Claims, 3 Drawing Sheets

(52) U.S. Cl.
CPC ...... *C01P 2004/03* (2013.01); *C01P 2004/80*
(2013.01); *C01P 2006/40* (2013.01)

(56) References Cited

FOREIGN PATENT DOCUMENTS

| | | | | |
|---|---|---|---|---|
| CN | 116995227 | A | 11/2023 | |
| CN | 117174846 | A * | 12/2023 | |
| CN | 117996015 | A | 5/2024 | |
| CN | 118472239 | A | 8/2024 | |
| WO | WO-2023071396 | A1 * | 5/2023 | .......... H01M 4/5825 |

OTHER PUBLICATIONS

Translated CN117174846A (Year: 2023).*
Translated WO2023071396A1 (Year: 2023).*
The search report of PCT Application No. PCT/CN2024/118066
issued on May 19, 2025.
The supplemental search report of Chinese Application No.
202411190978.9 issued on Jun. 12, 2025.

* cited by examiner

Fig. 1

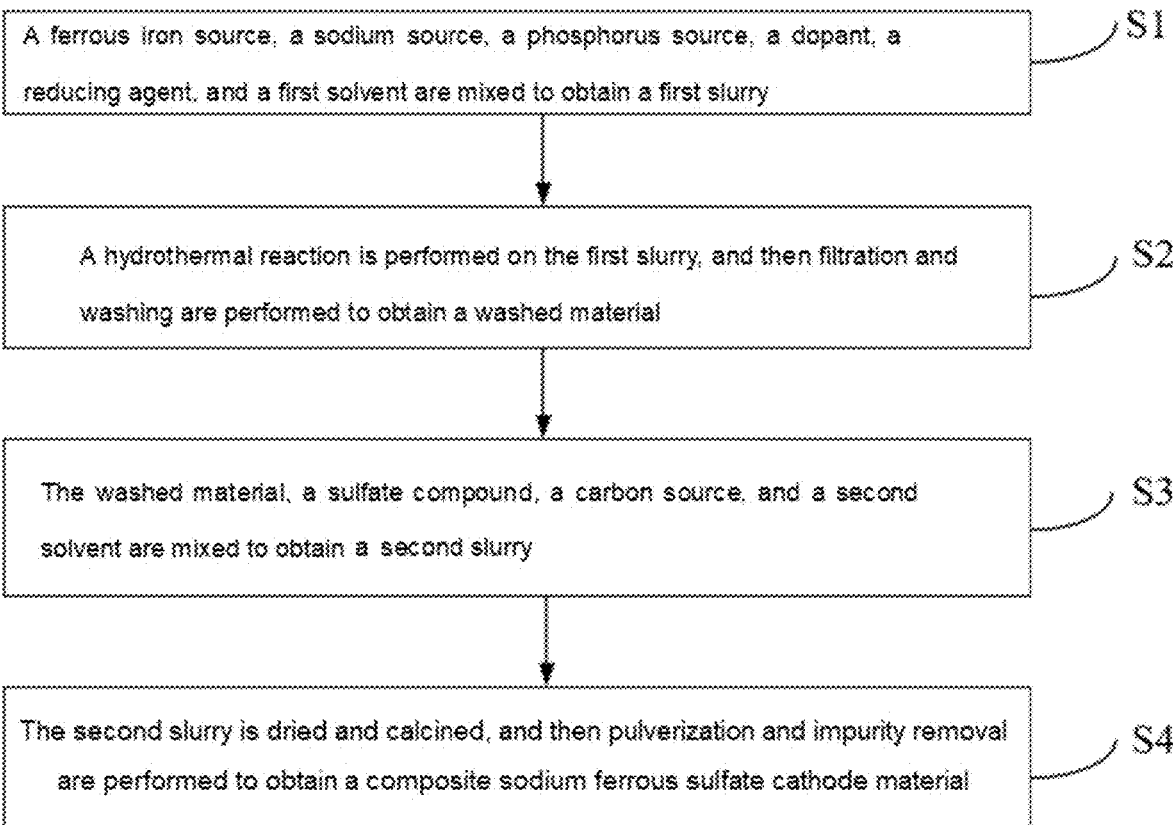

A ferrous iron source, a sodium source, a phosphorus source, a dopant, a reducing agent, and a first solvent are mixed to obtain a first slurry — S1

A hydrothermal reaction is performed on the first slurry, and then filtration and washing are performed to obtain a washed material — S2

The washed material, a sulfate compound, a carbon source, and a second solvent are mixed to obtain a second slurry — S3

The second slurry is dried and calcined, and then pulverization and impurity removal are performed to obtain a composite sodium ferrous sulfate cathode material — S4

COMPOSITE SODIUM FERROUS SULFATE CATHODE MATERIAL, AND PREPARATION METHOD AND APPLICATION THEREOF

CROSS-REFERENCE TO RELATED APPLICATION

This application claims priority to Chinese Patent Application No. 2024111909789 filed to the China National Intellectual Property Administration on Aug. 27, 2024 and entitled "Composite Sodium Ferrous Sulfate Cathode Material, and Preparation Method and Application Thereof", the disclosure of which is hereby incorporated by reference in its entirety.

TECHNICAL FIELD

The present disclosure relates to the technical field of sodium batteries, and specifically to a composite sodium ferrous sulfate cathode material, and a preparation method and application thereof.

BACKGROUND

With the development of lithium batteries, lithium has gradually become a bottleneck resource for new energy development. As an element in the same main group, sodium element has a electrochemical property very close to the lithium, has abundant reserves, has a crustal abundance of about 2.64%, and is cheaper in cost. Therefore, the use of sodium to replace the lithium to develop sodium-ion batteries has a very wide application prospect, and searching and developing an appropriate electrode material has become one of the main tasks in researching the sodium-ion batteries.

A polyanionic sodium battery material has the characteristics of being low in cost, excellent in cycling performance, etc. The research of a cathode material for sodium ion batteries also focuses on a polyanionic material. Among numerous polyanionic compounds, $SO_4^{2-}$ has higher electronegativity and a stronger inductive effect, such that a working voltage of a sulfate material is higher, thereby receiving more attentions. Since sodium ferrous sulfate is lower in sintering temperature and low in energy consumption, in the polyanionic material, the polyanion cost of a sulfate series is lower. When the sodium ferrous sulfate is used as the cathode material for sodium ion batteries, compared to a $LiFePO_4$ cathode material, a charging and discharging platform of a battery is higher. However, the sodium ferrous sulfate material has the disadvantages of being relatively low in electronic conductivity and sodium ion diffusion coefficient, which limit the actual application of the material.

In the related art, the ionic conductivity of the cathode material for polyanionic sodium batteries is generally increased by doping metal ions, and the electronic conductivity of the material is increased by means of carbon coating. In conventional doping methods, doped metal salts and an iron salt are generally mixed and ground first, and then the mixture is sintered. However, the cathode material obtained by the above solution is poor in electrical performance, the reason is that a sintering temperature of the cathode material cannot exceed 350° C. to prevent the decomposition of sulfate in a necessary raw material, but at the above temperature, an ion diffusion rate is slow, and it is difficult to achieve the formation of a uniformly-mixed eutectic body of the doped metal and iron. Therefore, it is necessary to provide a solution that reduces sulfate decomposition and improve the material performance of a composite sodium ferrous sulfate cathode material.

SUMMARY

In view of the technical problems in the BACKGROUND, the present disclosure provides a composite sodium ferrous sulfate cathode material, and a preparation method and application thereof, to solve the technical problem of how to reduce sulfate decomposition to improve the material performance of a composite sodium ferrous sulfate cathode material.

In a first aspect, an embodiment of the present disclosure provides a composite sodium ferrous sulfate cathode material, including a core-, where a chemical formula of the core is $Na_xM_yFe_z(PO_4)_k(SO_4)_{(0.4-0.6)x}O_t$, where M includes at least one of manganese, vanadium, or titanium, $16 \le x \le 17$, $y=1$, $4 \le z \le 5$, $2 \le k \le 2.6$, and $y+z-0.1x-1.5k \le t \le y+z+0.1x-1.5k$.

In the technical solution of this embodiment of the present disclosure, the ionic conductivity of the composite sodium ferrous sulfate cathode material is increased through element doping, and ensures a sodium ion diffusion coefficient, moreover, a retention degree of sulfate is high, and iron and doped metal forms a uniform core, so as to achieve further improvement of the performance of the composite sodium ferrous sulfate cathode material.

In some embodiments, the composite sodium ferrous sulfate cathode material further includes a carbon coating layer, where the carbon coating layer coats a surface of the core, and a molar ratio of a carbon element in the carbon coating layer to a sodium element in the core is greater than or equal to 0.5 and less than or equal to 1.

In these embodiments, the electron conductivity of the material is increased through a carbon-coated core-shell structure.

In some embodiments, a sodium ion diffusion coefficient of the composite sodium ferrous sulfate cathode material is $1*10^{-10}$ cm²/s-$5*10^{-10}$ cm²/s; and the powder resistivity is 15 Ω·cm-25 Ω·cm.

In these embodiments, the sodium ion diffusion coefficient is high, and the powder resistivity is low, such that the electrochemical performance of the obtained composite sodium ferrous sulfate cathode material is good.

In a second aspect, the present disclosure provides a method for preparing a composite sodium ferrous sulfate cathode material, including the following steps:

At S1, a ferrous iron source, a sodium source, a phosphorus source, a dopant, a reducing agent, and a first solvent are mixed to obtain a first slurry.

At S2, a hydrothermal reaction is performed on the first slurry, and then filtration and washing are performed to obtain a washed material.

At S3, the washed material, a sulfate compound, a carbon source, and a second solvent are mixed to obtain a second slurry.

At S4, the second slurry is dried and calcined, and then pulverization and impurity removal are performed to obtain a composite sodium ferrous sulfate cathode material.

In the technical solution of this embodiment of the present disclosure, first, under a hydrothermal condition, a uniform composite oxide precipitate containing doped metal phase, iron, and sodium is synthesized, and ferrous ions are prevented from being oxidized by adding the reducing agent; and through calcining, the carbon source is coated on a surface of a sodium ferrous sulfate composite, such that the powder resistivity of the material is effectively reduced, and the electronic conductivity of the material is improved. According to the method for preparing a composite sodium ferrous sulfate cathode material provided in the present disclosure, while sulfate decomposition is reduced, metal element doping and anion doping are performed, the sodium ion diffusion coefficient is increased, and the performance of the composite sodium ferrous sulfate cathode material is improved.

In some embodiments, in the first slurry, the dopant includes a doped element, and a molar ratio of the doped element to an iron element, a sodium element, and a phosphorus element is 1:(4-5):(16.0-17.0):(2-2.6); a molar ratio of an iron element in the ferrous iron source to the reducing agent is 1:(0.1-0.3); a solid content of the first slurry is 25%-35%; a molar ratio of a sodium element in the washed material to the carbon source is 1:(0.5-1); and a solid content of the second slurry is 20%-30%.

In these embodiments, by controlling the molar ratio of the doped element, the iron element, the sodium element, and the phosphorus element in the first slurry within the range, uniform mixing and eutectic of iron, sodium, and doped metal can be realized through the hydrothermal reaction, partial phosphate is doped at the same time, and if the ratio is unbalanced, it is not conducive to achieving the above objectives. It is conductive to preventing ferrous iron from being oxidized by controlling the molar ratio of the iron in the first slurry to the reducing agent within the range.

In some embodiments, the ferrous iron source includes at least one of ferrous acetate or ferrous phosphate; the sodium source includes at least one of sodium hydroxide, sodium oxide, sodium carbonate, sodium acetate, or sodium phosphate; the phosphorus source includes sodium phosphate; the reducing agent includes sodium phosphite; the dopant includes at least one of a manganese source, a vanadium source, or a titanium source; the carbon source includes at least one of graphene or a carbon nanotube; and the sulfate compound includes at least one of sulfuric acid or ammonium sulphate.

In some embodiments, the sulfate compound includes sulfuric acid and ammonium sulphate; in the second slurry, a molar ratio of a sodium element in the washed material to the sulfuric acid is 1:(0.3-0.4); and a molar ratio of the sodium element in the washed material to the ammonium sulphate is 1:(0.1-0.2).

In these embodiments, it is conductive to improving ionic conductivity by introducing the manganese source, the vanadium source, or the titanium source as the dopant.

In some embodiments, a temperature of the hydrothermal reaction is 200° C.-300° C., a time for the hydrothermal reaction is 12 h-15 h, and pressure of the hydrothermal reaction is 1.5 MPa-2 MPa; and the hydrothermal reaction is performed while stirring.

In these embodiments, by controlling the temperature and time of the hydrothermal reaction within the range, the reaction can be ended completely, and excessive energy consumption can be avoided. If the temperature of the hydrothermal reaction is too high, energy consumption is high, and the requirements for devices are also high; if the temperature of the hydrothermal reaction is low, the reaction cannot be ended completely; if the time for the hydrothermal reaction is too long, energy consumption is high, and production efficiency is low; and if the time for the hydrothermal reaction is too short, the reaction cannot be ended completely.

In some embodiments, the hydrothermal reaction is performed while stirring, and a stirring speed is 200 r/min-300 r/min.

In some embodiments, in the second slurry, a molar ratio of a sodium element in the washed material to the sulfuric acid is 1:(0.3-0.4); a molar ratio of the sodium in the washed material to the ammonium sulphate is 1:(0.1-0.2); a molar ratio of a sodium element in the washed material to the carbon source is 1:(0.5-1); and a solid content of the second slurry is 20%-30%.

In these embodiments, by controlling the molar ratio of sulfate, partial sulfate may be replaced with oxygen (from metallic oxide that formed by a high temperature hydrothermal method) or phosphate in the washed material, such that the doping and compounding of anions are realized while cation doping is performed.

In some embodiments, in the step of drying and calcining the second slurry, a calcining temperature is 300° C.-350° C., a calcining time is 4 h-8 h, a heating rate is 1° C./min-2° C./min, a cooling rate is 2° C./min-4° C./min, and calcining is performed under a protective atmosphere.

In these embodiments, by drying and calcining the second slurry, the carbon source is used as a coating layer to coat the surface of the sodium ferrous sulfate composite without causing sulfate decomposition.

In some embodiments, spray drying is used for drying, an inlet air temperature for spray drying is 150° C.-350° C., and an outlet air temperature is 70° C.-95° C., so as to improve the efficiency of spray drying.

In some embodiments, airflow pulverization is used for pulverization, a protective gas is used as a gas source for pulverization, and an air pressure is 0.5 MPa-0.8 MPa, so as to improve pulverization efficiency.

In a third aspect, an embodiment of the present disclosure provides a cathode plate, including the composite sodium ferrous sulfate cathode material provided in the present disclosure or a composite sodium ferrous sulfate cathode material prepared by the method for preparing a composite sodium ferrous sulfate cathode material provided in the present disclosure.

In the technical solution of this embodiment of the present disclosure, the cathode plate includes the composite sodium ferrous sulfate cathode material, such that when being applied to a secondary battery, the electrical performance of the composite sodium ferrous sulfate cathode material is more excellent in terms of discharging capacity, cycling performance, etc.

In a fourth aspect, an embodiment of the present disclosure provides a secondary battery, including the cathode plate provided in the third aspect of the present disclosure.

In the technical solution of this embodiment of the present disclosure, the secondary battery includes the cathode plate, and thus has more excellent advantages in terms of charging capacity, discharging capacity, cycling performance, etc.

Compared with the related art, the present disclosure has the following the beneficial effects. The ionic conductivity of the composite sodium ferrous sulfate cathode material is increased through element doping, ensures a sodium ion diffusion coefficient, moreover, a retention degree of sulfate is high, and iron and doped metal forms a uniform compound, so as to achieve further improvement of the performance of the composite sodium ferrous sulfate cathode material.

The above descriptions are only an overview of the technical solutions of the present disclosure. In order to have a clearer understanding of the technical means of the present disclosure, and implement same according to the contents of the specification and in order to make the above and other purposes, features, and advantages of the present disclosure more obvious and easier to understand, the specific embodiments of the present disclosure are specifically listed below.

BRIEF DESCRIPTION OF THE DRAWINGS

In order to more clearly explain the technical solutions of the present disclosure, a brief introduction will be given below to the drawings required to be used in the present disclosure. It is apparent that the drawings in the following descriptions are merely some implementations of the present disclosure. Other drawings can be obtained from those of ordinary skill in the art according to these drawings without any creative work.

FIG. 1 is a process flow diagram of a method for preparing a composite sodium ferrous sulfate cathode material according to embodiments of the present disclosure.

DETAILED DESCRIPTION OF THE EMBODIMENTS

Figure 2:
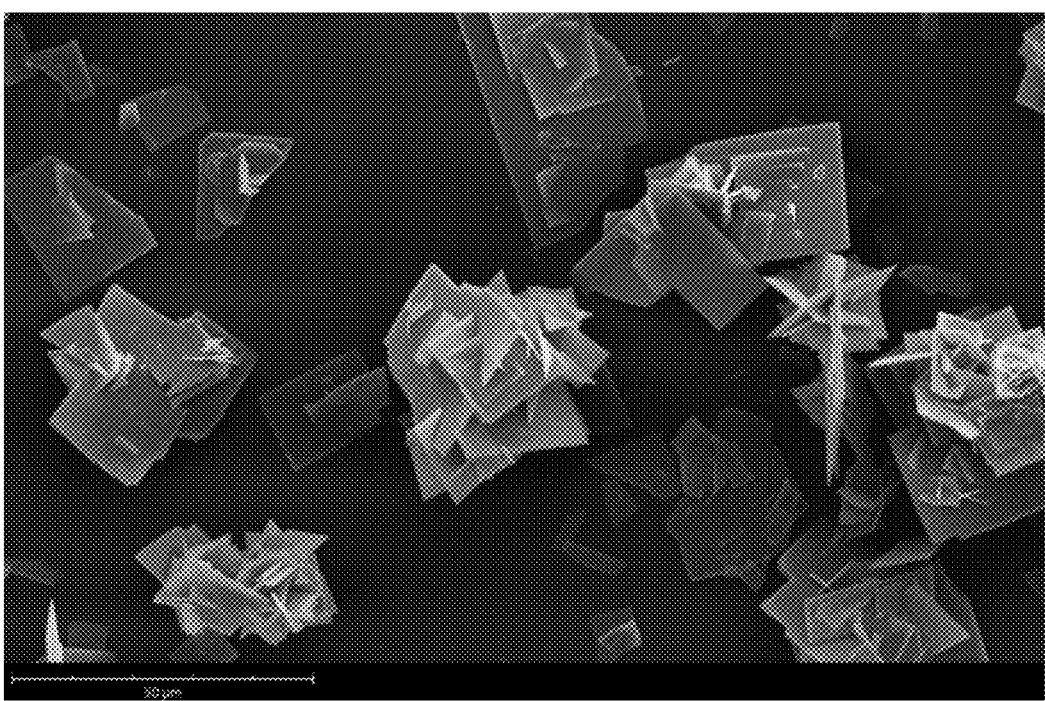
FIG. 2 is a Scanning Electron Microscope (SEM) result diagram of a washed material obtained according to Embodiment 1 of the present disclosure.

The embodiments of the technical solutions of the present disclosure will be described in detail below in conjunction with the accompanying drawings. The following embodiments are only intended to provide a clearer explanation of the technical solutions of the present disclosure, and therefore they are only used as examples and rather than as limitations to the scope of protection of the present disclosure.

Unless otherwise defined, all technical and scientific terms as used herein have the same meanings as those commonly understood by those skilled in the technical field of the present disclosure; the terms as used herein are only intended for the purpose of describing specific embodiments rather than limiting the present disclosure; and the terms "including" and "having" in the description and claims, as well as the accompanying drawings of the present disclosure, and any variations thereof, are intended to cover non-exclusive inclusion.

In the description of embodiments of the present disclosure, the technical terms "first" and "second", etc., are only used to distinguish different objects and cannot be understood as indicating or implying relative importance or implicitly indicating the number, specific order or primary and secondary relationships of the indicated technical features. In the description of embodiments of the present disclosure, "multiple" means more than two, unless otherwise specifically defined explicitly.

Reference to "embodiments" herein means that specific features, structures, or characteristics described in combination with embodiments may be included in at least one embodiment of the present disclosure. The phrase appearing at various positions in the specification does not necessarily refer to the same embodiment, nor is it an independent or alternative embodiment mutually exclusive with other embodiments. Those skilled in the art will explicitly and implicitly understand that the embodiments described herein can be combined with other embodiments.

In the description of the embodiments of the present disclosure, the term "and/or" is only used to describe an association relationship describing the associated objects, indicating that there can be three kinds of relationships, for example "A" and/or "B" may indicate three cases: existence of "A" alone, coexistence of "A" and "B", and existence of "B" alone. In addition, the character "/" as used herein generally indicates an "or" relationship between the front and back associated objects.

In the description of the embodiments of the present disclosure, the term "multiple" refers to more than two (including two), similarly, "multiple groups" refers to more than two groups (including two groups), and "multiple pieces" refers to more than two pieces (including two pieces).

In current preparation of a sodium ferrous sulfate cathode material, since sulfate is easy to decompose, a sintering temperature is relatively low, which is generally below 350° C., under the temperature, an ion diffusion rate is slow, and it is difficult to realize uniform mixing of doped metal and iron and formation of a eutectic body, leading to insufficient performance of the finally obtained cathode material.

In order to solve the technical problem in the related art that conventional doping methods are difficult to realize the uniform mixing of the doped metal and the iron and the formation of the eutectic body, leading to insufficient performance of the finally obtained cathode material, the present disclosure provides a composite sodium ferrous sulfate cathode material and a preparation method thereof, and a cathode plate and a secondary battery. In the present disclosure, under a high temperature hydrothermal method condition, the uniform mixing and eutectic of iron, sodium, and doped metal are realized, partial phosphorus source is doped at the same time, and then the composite sodium ferrous sulfate cathode material is obtained through the conversion of anions at a high temperature. The ionic conductivity of the composite sodium ferrous sulfate cathode material is increased through element doping, ensures a sodium ion diffusion coefficient, moreover, a retention degree of sulfate is high, and iron and doped metal forms a uniform compound, so as to achieve further improvement of the performance of the composite sodium ferrous sulfate cathode material.

In a first aspect, an embodiment of the present disclosure provides a composite sodium ferrous sulfate cathode material, including a core, where a chemical formula of the core is $Na_xM_yFe_z(PO_4)_k(SO_4)_{(0.4-0.6)x}O_t$, where M includes at least one of manganese, vanadium, or titanium sources, $16 \leq x \leq 17$, $y=1$, $4 \leq z \leq 5$, $2 \leq k \leq 2.6$, and $y+z-0.1x-1.5k \leq t \leq y+z+0.1x-1.5k$.

In the technical solution of this embodiment of the present disclosure, the ionic conductivity of the composite sodium ferrous sulfate cathode material is increased by doping M ions, ensures the sodium ion diffusion coefficient, and a retention degree of sulfate is high, and iron and doped metal forms a uniform core, so as to achieve further improvement of the performance of the composite sodium ferrous sulfate cathode material.

In some embodiments, the composite sodium ferrous sulfate cathode material further includes a carbon coating layer, where the carbon coating layer coats a surface of the core, and a molar ratio of a carbon element in the carbon coating layer to a sodium element in the core is greater than or equal to 0.5 and less than or equal to 1. For example, the molar ratio of the carbon element in the carbon coating layer to the sodium element in the core is any value among 0.5, 0.6, 0.7, 0.8, 0.9, 1.0, and 0.5 to 1.0.

In some embodiments, a mass fraction of the carbon coating layer in the composite sodium ferrous sulfate cathode material is 5% to 10%, for example, may be any value among 5.5%, 5.8%, 6%, 7%, 7.5%, 8%, 9%, 9.5%, or 5% to 10%.

In these embodiments, the electron conductivity of the material is increased through a carbon-coated core-shell structure.

In some embodiments, the composite sodium ferrous sulfate cathode material includes the core and the carbon coating layer. A chemical formula of the composite sodium ferrous sulfate cathode material is $Na_xM_yFe_z(PO_4)_k(SO_4)_{(0.4-0.6)x}O_t/C$, where M includes at least one of manganese, vanadium, or titanium sources, $16 \leq x \leq 17$, $y=1$, $4 \leq z \leq 5$, $2 \leq k \leq 2.6$, and $y+z-0.1x-1.5k \leq t \leq y+z+0.1x-1.5k$.

In some embodiments, the chemical formula of the composite sodium ferrous sulfate cathode material is $Na_{16.6}MnFe_{4.5}(PO_4)_{2.3}(SO_4)_{8.3}O_{2.05}/C$, $Na_{16}MnFe_4(PO_4)_2(SO_4)_{6.4}O_{3.6}/C$, $Na_{17}MnFe_5(PO_4)_{2.6}(SO_4)_{9.35}O_{0.85}/C$, $Na_{16.6}VFe_{4.5}(PO_4)_{2.3}(SO_4)_{8.3}O_{2.05}/C$, $Na_{16.6}TiFe_{4.5}(PO_4)_{2.3}(SO_4)_{8.3}O_{3.05}/C$.

In some embodiments, a sodium ion diffusion coefficient of the composite sodium ferrous sulfate cathode material is $1*10^{-10}$ cm²/s-$5*10^{-10}$ cm²/s. For example, the sodium ion diffusion coefficient of the composite sodium ferrous sulfate cathode material is any value among $1*10^{-10}$ cm²/s, $2*10^{-10}$ cm²/s, $2.5*10^{-10}$ cm²/s, $3*10^{-10}$ cm²/s, $4*10^{-10}$ cm²/s, $5*10^{-10}$ cm²/s, or $1*10^{-10}$ cm²/s-$5*10^{-10}$ cm²/s. The powder resistivity of the composite sodium ferrous sulfate cathode material is 150 Ω·cm-25 Ω·cm. For example, the powder resistivity of the composite sodium ferrous sulfate cathode material is any value among 15 Ω·cm, 18 Ω·cm, 20 Ω·cm, 22 Ω·cm, 25 Ω·cm, or 15 Ω·cm-25 Ω·cm.

In these embodiments, the sodium ion diffusion coefficient of the composite sodium ferrous sulfate cathode material is high, and the powder resistivity is low; and when the material is applied to a secondary battery, the electrochemical performance of the battery is improved.

Referring to FIG. 1, an embodiment of the present disclosure provides a method for preparing a composite sodium ferrous sulfate cathode material. The preparation method includes the following steps.

At S1, a ferrous iron source, a sodium source, a phosphorus source, a dopant, a reducing agent, and a first solvent are mixed and homogenized to a slurry state to obtain a first slurry.

At S2, a hydrothermal reaction is performed on the first slurry, and then filtration and washing are performed to obtain a washed material.

In S1 and S2, under a hydrothermal condition, the ferrous iron source, the sodium source, the phosphorus source, the dopant, and the reducing agent are used to synthesize a uniform composite oxide precipitate containing doped with a metal phase, iron, and sodium, and ferrous ions are prevented from being oxidized by adding the reducing agent; and a uniform compound can be formed by various materials through S1 and S2.

At S3, the washed material, a sulfate compound, a carbon source, and a second solvent are mixed to obtain a second slurry.

S3 is an anion conversion process, and is intended to introduce sulfate into the composite sodium ferrous sulfate cathode material; and at the same time, by adding a sulfate compound (e.g., sulfuric acid and/or ammonium sulfate), such that the sulfate may be introduced, pH may also be regulated, and ammonium ions are easy to volatilize, and hydrogen ions are easy to neutralize without causing residues.

At S4, spray drying and calcining are performed on the second slurry, and then pulverization and impurity removal are performed to obtain a composite sodium ferrous sulfate cathode material.

In S4, through spray drying, the uniform mixing of the carbon source and composite oxide containing iron, sodium and doped metal may be realized, and then through calcining, the carbon source may be coated on the surface of sodium ferrous sulfate composite, such that the powder resistivity of the material is effectively reduced, and the electronic conductivity of the material is improved.

In the present disclosure, the type of the carbon source is not limited, and may be limited by those skilled in the art according to actual situations. For example, the carbon source may be graphene, a carbon nanotube (CNT), etc.

Further, in some embodiments, in the first slurry, a molar ratio of the doped element in the dopant, an iron element, a sodium element, and a phosphorus element is 1:(4-5):(16.0-17.0):(2-2.6). Suitable but non-restrictive, the molar ratio of the doped element in the dopant, the iron element, the sodium element, and the phosphorus element is 1:4:16:2, 1:5:17:2.6, or 1:4:17:2.3.

In the technical solution of this embodiment of the present disclosure, by controlling the molar ratio of the doped element, the iron element, the sodium element, and the phosphorus element in the first slurry within the range, uniform mixing and eutectic of the iron element, the sodium element, and the doped metal can be realized through the hydrothermal reaction, partial phosphate is doped at the same time, and if the ratio is unbalanced, it is difficult to achieve the above objectives.

Further, in some embodiments, in the first slurry, a molar ratio of the iron element to the reducing agent is 1:(0.1-0.3). For example, the molar ratio of the iron element to the reducing agent is 1:0.1, 1:0.2, or 1:0.3.

In the technical solution of this embodiment of the present disclosure, ferrous iron can be prevented from being oxidized by controlling the molar ratio of the iron in the first slurry to the reducing agent within the range. If the amount of the reducing agent added is too much, the proportioning of a final product is unbalanced, and a phosphate content is high, finally affecting the cycling performance and capacity of the material.

Further, in some embodiments, the ferrous iron source includes at least one of ferrous acetate or ferrous phosphate; the sodium source includes at least one of sodium hydroxide, sodium oxide, sodium carbonate, sodium acetate, or sodium phosphate; the phosphorus source includes sodium phosphate; the reducing agent includes sodium phosphite; the dopant includes at least one of a manganese source, a vanadium source, or a titanium source; the manganese source includes at least one of manganese sulfate, manganese nitrate, or manganese acetate; the vanadium source includes at least one of ammonium metavanadate or sodium metavanadate; the titanium source includes titanium tetrachloride; the carbon source includes at least one of graphene or a carbon nanotube; and the sulfate compound includes at least one of sulfuric acid or ammonium sulphate. It may be understood that, the compounds having the phosphorus element and the sodium element may be simultaneously used as the phosphorus source and the sodium source, such as sodium phosphite, and at the same time, phosphorous acid is also be used as the reducing agent. In some embodiments, the sodium source is sodium hydroxide, sodium oxide, or sodium carbonate, and an alkaline environment is provided for the reaction while the sodium source is provided.

In the present disclosure, the type of the dopant is not limited, and may be selected by those skilled in the art according to actual situations, as long as it can improve the ionic conductivity of the cathode material through doping. For example, the dopant may be one or several of the manganese source, the vanadium source, and the titanium source.

In the technical solution of this embodiment of the present disclosure, the improvement of the ionic conductivity may be realized by introducing the manganese source as the dopant.

In the present disclosure, the type of the manganese source is not limited, and may be selected by those skilled in the art according to actual situations. For example, the manganese source is manganese acetate, or the like.

Further, in some embodiments, in the first slurry, the dopant is the manganese acetate, the ferrous iron source is the ferrous acetate, the sodium source is the sodium hydroxide and sodium phosphate, the phosphorus source is sodium phosphate, and the reducing agent is the sodium phosphite. A molar ratio of the manganese acetate to the ferrous acetate is 1:(4-5); a molar ratio of the manganese acetate to the sodium hydroxide is 1:(8-12); a molar ratio of the manganese acetate to the sodium phosphite is 1:(0.5-1); and a molar ratio of the manganese acetate to the sodium phosphate is 1:(1-2).

Further, in some embodiments, in the first slurry, the dopant is the ammonium metavanadate, the ferrous iron source is the ferrous phosphate, the sodium source is the sodium carbonate, the phosphorus source is sodium phosphate, and the reducing agent is the sodium phosphite. A molar ratio of the ammonium metavanadate to the ferrous phosphate is 1:(4-5); a molar ratio of the ammonium metavanadate to the sodium carbonate is 1:(8-12); a molar ratio of the ammonium metavanadate to the sodium phosphite is 1:(0.5-1); and a molar ratio of the ammonium metavanadate to the sodium phosphate is 1:(1-2).

Further, in some embodiments, in the first slurry, the dopant is the titanium tetrachloride, the ferrous iron source is the ferrous acetate, the sodium source is the sodium carbonate, the phosphorus source is sodium phosphate, and the reducing agent is the sodium phosphite. A molar ratio of the titanium tetrachloride to the ferrous acetate is 1:(4-5); a molar ratio of the titanium tetrachloride to the sodium carbonate is 1:(8-12); a molar ratio of the titanium tetrachloride to the sodium phosphite is 1:(0.5-1); and a molar ratio of the titanium tetrachloride to the sodium phosphate is 1:(1-2).

Further, in some embodiments, in the first slurry, a solid content (the solid content in the first slurry is a mass fraction of a solid in the first slurry) is 25%-35%, including but not limited to 25%, 27%, 29%, 31%, 33%, 35%, etc., and the present disclosure is not limited thereto.

In the technical solution of this embodiment of the present disclosure, if the amount of the first solvent used is too low, it is easy to cause some of the raw materials to be unable to be completely dissolved into the water and precipitate into crystals; and if the amount of the first solvent used is too high, production efficiency is low. Suitable but non-restrictive, the first solvent is selected from pure water, deionized water, distilled water, etc.

Further, in some embodiments, a temperature of the hydrothermal reaction is 200° C.-300° C., including but not limited to 200° C., 220° C., 240° C., 260° C., 280° C., 300°

C., etc., and the present disclosure is not limited thereto. A time for the hydrothermal reaction is 12 h-15 h, including but not limited to 12 h, 13 h, 14 h, 15 h, etc., and the present disclosure is not limited thereto. Pressure is 1.5 MPa-2 MPa, including but not limited to 1.5 MPa, 1.6 MPa, 1.7 MPa, 1.8 MPa, 1.9 MPa, 2 MPa, etc., and the present disclosure is not limited thereto.

In the technical solution of this embodiment of the present disclosure, by controlling the temperature and time of the hydrothermal reaction within the range, the reaction can be ended completely, and excessive energy consumption can be avoided. If the temperature of the hydrothermal reaction is too high, energy consumption is high, and the requirements for devices are also high; if the temperature of the hydrothermal reaction is low, the reaction cannot be ended completely; if the time for the hydrothermal reaction is too long, energy consumption is high, and production efficiency is low; and if the time for the hydrothermal reaction is too short, the reaction cannot be ended completely.

Further, in some embodiments, the hydrothermal reaction is performed while stirring.

Further, in some embodiments, during the hydrothermal reaction, a stirring speed is 200 r/min-300 r/min, including but not limited to 200 r/min, 220 r/min, 240 r/min, 260 r/min, 280 r/min, 300 r/min, etc., and the present disclosure is not limited thereto.

Further, in some embodiments, washing is performed until the conductivity of washing water after washing is ≤500 μS/cm.

Further, in some embodiments, in the second slurry, a molar ratio of sodium in the washed material to the sulfuric acid is 1:(0.3-0.4), including but not limited to 1:0.3, 1:0.32, 1:0.34, 1:0.36, 1:0.38, 1:0.4, etc., and the present disclosure is not limited thereto. A molar ratio of the sodium in the washed material to the ammonium sulphate is 1:(0.1-0.2), including but not limited to 1:0.1, 1:0.12, 1:0.14, 1:0.16, 1:0.18, 1:0.2, etc., and the present disclosure is not limited thereto.

In the technical solution of this embodiment of the present disclosure, when the sulfate is introduced, partial sulfate may be oxidized (from metallic oxide that formed by a high temperature hydrothermal method) and replaced with phosphate by controlling the ratio of the sulfate, and the doping and compounding of anions are realized while cation doping is performed.

Further, in some embodiments, a molar ratio of the sodium in the washed material to the carbon source is 1:(0.5-1), including but not limited to 1:0.5, 1:0.6, 1:0.7, 1:0.8, 1:0.9, 1:1, etc., and the present disclosure is not limited thereto.

Further, in some embodiments, in the second slurry, a solid content (the solid content in the second slurry is a mass fraction of a solid in the second slurry) is 20%-30%, including but not limited to 20%, 22%, 24%, 26%, 28%, 30%, etc., and the present disclosure is not limited thereto.

In the technical solution of this embodiment of the present disclosure, if the solid content in the second slurry is too high, material blocking is easy to occur during drying (e.g., spray drying); and if the solid content in the second slurry is too low, energy consumption required for drying is too large.

In some embodiments, the second solvent used in the second slurry is selected from one of pure water, deionized water, or distilled water; and the carbon source is CNT.

In S4, the second slurry is dried and calcined; and then pulverization and impurity removal are performed to obtain the composite sodium ferrous sulfate cathode material.

In some embodiments, spray drying is used for drying, and parameters for spray drying are as follows: an inlet air temperature is 150° C.-350° C., including but not limited to 150° C., 200° C., 250° C., 300° C., 350° C., etc., and the present disclosure is not limited thereto; and an outlet air temperature is 70° C.-95° C., including but not limited to 70° C., 75° C., 80° C., 85° C., 90° C., 95° C., etc., and the present disclosure is not limited thereto. During spray drying, a protective gas is used as a gas source. A particle size of a spray-drying material is 3 μm-10 μm, including but not limited to 3 μm, 4 μm, 5 μm, 6 μm, 7 μm, 8 μm, 9 μm, 10 μm, etc., and the present disclosure is not limited thereto.

In some embodiments, parameters for calcining are as follows: a calcining temperature is 300° C.-350° C., including but not limited to 300° C., 310° C., 320° C., 330° C., 340° C., 350° C., etc., and the present disclosure is not limited thereto; a calcining time is 4 h-8 h, including but not limited to 4 h, 5 h, 6 h, 7 h, 8 h, etc., and the present disclosure is not limited thereto; and calcining is performed under the protective gas.

In the present disclosure, the type of the protective gas is not limited, and may be selected by those skilled in the art according to actual situations, for example, may be nitrogen, argon, etc. In the calcining process, a heating rate is 1° C./min-2° C./min, and a cooling rate is 2° C./min-4° C./min; and discharging is performed after the temperature is cooled until a material temperature of the calcined material is ≤70° C.

Pulverization and impurity removal include airflow pulverization, sieving, iron removal, and packaging processes. In some embodiments, during airflow pulverization, the protective gas is used as the gas source for pulverization, and an air pressure is 0.5 MPa-0.8 MPa; and pulverization is performed until the particle size of the material is 1 μm-3 μm, and under this condition, pulverization is more completed, facilitating subsequent sieving. In some embodiments, a 100-200-mesh ultrasonic vibrating screen is used during sieving, so as to obtain particles with uniform particle sizes.

In some embodiments, an electromagnetic iron remover is used for iron removal. In some embodiments, packaging is performed in a constant temperature and humidity room, with the humidity ≤10% and the temperature being 25° C.±5° C.

An embodiment of the present disclosure provides a cathode plate, including the composite sodium ferrous sulfate cathode material provided in the present disclosure or a composite sodium ferrous sulfate cathode material prepared by the method for preparing a composite sodium ferrous sulfate cathode material provided in the present disclosure.

In the technical solution of this embodiment of the present disclosure, the cathode plate includes the composite sodium ferrous sulfate cathode material, such that when being applied to a secondary battery, the electrical performance of the composite sodium ferrous sulfate cathode material is more excellent in terms of discharging capacity, cycling performance, etc.

An embodiment of the present disclosure provides a secondary battery, including the cathode plate provided in the third aspect of the present disclosure.

In the technical solution of this embodiment of the present disclosure, the secondary battery includes the cathode plate, and thus has more excellent advantages in terms of charging capacity, discharging capacity, cycling performance, etc.

Some specific embodiments are listed below. It should be noted that the embodiments described below are exemplary and are only intended to explain the present disclosure, which cannot be understood as limitations to the present disclosure. If no specific technology or conditions are indicated in the examples, the technology or conditions described in the literature in the art or the product specification shall be followed. The reagents or instruments used of which the manufacturers are not indicated are conventional products that are commercially available.

I. Preparation Method

Embodiment 1

Preparation of a composite sodium ferrous sulfate cathode material in this embodiment was as follows.

(1) Manganese acetate, ferrous acetate, sodium hydroxide, sodium phosphite, and sodium phosphate were mixed according to a molar ratio being 1:4.5:10.5:0.8:1.5, then pure water was added to cause a solid content to be 29%, mixing and slurrying were performed to obtain a first slurry, in the first slurry, a molar ratio of manganese to iron, sodium, and phosphorus was 1:4.5:16.6:2.3, and a molar ratio of iron in the ferrous acetate to a reducing agent sodium phosphite was 1:0.178.

(2) The first slurry was added to a high pressure hydrothermal reactor to perform a reaction for 13 h at 260° C., pressure was 1.8 MPa, a stirring rate was 250 r/min, then filtration and washing were performed by using pure water, and washing was performed until the conductivity of washing water after washing of the first slurry was ≤500 μS/cm, so as to obtain a washed material.

(3) Sulfuric acid, ammonium sulfate, and CNT were added to the washed material, a molar ratio of sodium in the washed material to the sulfuric acid, ammonium sulfate, and CNT added was 1:0.35:0.15:0.7, then the pure water was added and stirred for slurrying to cause the solid content to be 25%, so as to obtain a second slurry.

(4) Spray drying was performed on the second slurry, an inlet air temperature was 1500C, an outlet air temperature was 70° C., a protective gas was used as a gas source to obtain a spray-drying material, a particle size of the spray-drying material was 7 μm, then calcining was performed, during calcining, a heating rate was 1.5° C./min, a temperature was heated to 330° C., a calcining time was 7 h, a cooling rate was 3° C./min, and discharging was performed until a material temperature of the material was cooled to be s 70° C., so as to obtain a calcined material; and airflow pulverization was performed on the obtained calcined material, 0.7 MPa nitrogen was used as gas source for pulverization, pulverization was performed until the particle size of the material was 1.7 μm, then a 100-mesh ultrasonic vibrating screen was used for sieving, iron removal was performed on the sieved material by using an electromagnetic iron remover, and then packaging was performed in a constant temperature and humidity room, with the humidity ≤10% and the temperature being 25±5° C., so as to obtain the composite sodium ferrous sulfate cathode material.

In this embodiment, a chemical formula of the finally-obtained composite sodium ferrous sulfate cathode material was $Na_{16.6}MnFe_{4.5}(PO_4)_{2.3}(SO_4)_{8.3}O_{2.05}/C$, and a final carbon content was 7.26%.

Embodiment 2

Preparation of a composite sodium ferrous sulfate cathode material in this embodiment was as follows.

(1) Manganese acetate, ferrous acetate, sodium hydroxide, sodium phosphite, and sodium phosphate were mixed according to a molar ratio being 1:4:10.4:0.4:1.6, then pure water was added to cause a solid content to be 29%, mixing and slurrying were performed to obtain a first slurry, in the first slurry, a molar ratio of doped metal to iron, sodium, and phosphorus was 1:4:16:2, and a molar ratio of the iron to a reducing agent was 1:0.1.

(2) The first slurry was added to a high pressure hydrothermal reactor to perform a reaction for 15 h at 200° C., pressure was 1.5 MPa, a stirring rate was 250 r/min, then filtration and washing were performed by using pure water, and washing was performed until the conductivity of washing water after washing of the first slurry was ≤500 μS/cm, so as to obtain a washed material.

(3) Sulfuric acid, ammonium sulfate, and CNT were added to the washed material, a molar ratio of sodium in the washed material to the sulfuric acid, ammonium sulfate, and CNT added was 1:0.3:0.1:0.5, then the pure water was added and stirred for slurrying to cause the solid content to be 25%, so as to obtain a second slurry.

(4) Spray drying was performed on the second slurry, nitrogen with a temperature of 230° C. was used as the gas source for spray drying, so as to obtain a spray-drying material, a particle size of the spray-drying material was 3 μm, then calcining was performed, during calcining, a calcining temperature was 3000C, a calcining time was 8 h, a heating rate was 1° C./min, a cooling rate was 2° C./min, and discharging was performed until a material temperature of the material was cooled to be s 70° C., and calcining was performed under a protective gas; during airflow pulverization, an air pressure was 0.5 MPa, pulverization was performed until the particle size of the material was 1 μm; during sieving, a 200-mesh ultrasonic vibrating screen was used; during iron removal, an electromagnetic iron remover was used for iron removal; and packaging was performed in a constant temperature and humidity room, with the humidity ≤10% and the temperature being 25±5° C., so as to obtain the composite sodium ferrous sulfate cathode material.

In this embodiment, a chemical formula of the finally-obtained composite sodium ferrous sulfate cathode material was $Na_{16}MnFe_4(PO_4)_2(SO_4)_{6.4}O_{3.6}/C$, and a final carbon content was 5.86%.

Embodiment 3

A method for preparing a composite sodium ferrous sulfate cathode material in this embodiment was the same as Embodiment 1. Differences between this embodiment and Embodiment 1 lied in that, in the obtained first slurry, the molar ratio of the doped metal to the iron, sodium, and phosphorus was 1:5:17:2.6; the molar ratio of the iron to the reducing agent was 1:0.3; and a solid content of the first slurry was 35%.

A temperature of a hydrothermal reaction was 300° C., a time for the hydrothermal reaction was 12 h, and pressure of the hydrothermal reaction was 2 MPa; and the hydrothermal reaction was performed while stirring.

In the second slurry, a molar ratio of sodium in the washed material to sulfuric acid was 1:0.35; a molar ratio of the sodium in the washed material to the ammonium sulphate was 1:0.2; the solid content of the second slurry was 30%; and a molar ratio of the sodium in the washed material to a carbon source CNT was 1:1.

During spray drying, an inlet air temperature was 350° C., an outlet air temperature was 95° C., a protective gas was used as a gas source, a particle size of the spray-drying material was 10 μm; during calcining, a calcining temperature was 350° C., a calcining time was 4 h, a heating rate was 2° C./min, a cooling rate was 4° C./min, and discharging was performed until a material temperature of the material was cooled to be s 70° C., and calcining was performed under the protective gas; during airflow pulverization, an air pressure was 0.8 MPa, pulverization was performed until the particle size of the material was 3 μm; during sieving, a 100-mesh ultrasonic vibrating screen was used; during iron removal, an electromagnetic iron remover was used for iron removal; and packaging was performed in a constant temperature and humidity room, with the humidity ≤10% and the temperature being 25±5° C.

In this embodiment, a chemical formula of the finally-obtained composite sodium ferrous sulfate cathode material was $Na_{17}MnFe_5(PO_4)_{2.6}(SO_4)_{9.35}O_{0.85}/C$, and a final carbon content was 9.78%.

Embodiment 4

A method for preparing a composite sodium ferrous sulfate cathode material in this embodiment was the same as Embodiment 1. Differences between this embodiment and Embodiment 1 lied in that, manganese acetate was replaced with sodium metavanadate.

In this embodiment, a chemical formula of the finally-obtained composite sodium ferrous sulfate cathode material was $Na_{16.6}VFe_{4.5}(PO_4)_{2.3}(SO_4)_{8.3}O_{2.05}/C$, and a final carbon content was 7.75%.

Embodiment 5

A method for preparing a composite sodium ferrous sulfate cathode material in this embodiment was the same as Embodiment 1. Differences between this embodiment and Embodiment 1 lied in that, manganese acetate was replaced with titanium tetrachloride.

In this embodiment, a chemical formula of the finally-obtained composite sodium ferrous sulfate cathode material was $Na_{16.6}TiFe_{4.5}(PO_4)_{2.3}(SO_4)_{8.3}O_{3.05}/C$, and a final carbon content was 7.78%.

Embodiment 6

A method for preparing a composite sodium ferrous sulfate cathode material in this embodiment was the same as Embodiment 1. Differences between this embodiment and Embodiment 1 lied in that, the solid content of the first slurry was 25%, the solid content of the second slurry was 20%, and the carbon source was graphene. In this embodiment, a chemical formula of the finally-obtained composite sodium ferrous sulfate cathode material was $Na_{16.6}MnFe_{4.5}(PO_4)_{2.3}(SO_4)_{8.3}O_{2.05}/C$, and a final carbon content was 7.21%.

Comparative Example 1

Preparation of a composite sodium ferrous sulfate cathode material was as follows.

(1) Ferrous acetate, sodium hydroxide, sodium phosphite, and sodium phosphate were mixed according to a molar ratio being 5.5:10.5:0.98:1.32, then pure water was added to cause a solid content to be 29%, mixing and slurrying were performed to obtain a first slurry, in the first slurry, a molar ratio iron, sodium, and phosphorus was 5.5:16.6:2.3, and a molar ratio of iron in the ferrous acetate to a reducing agent sodium phosphite was 1:0.178.

(2) The first slurry was added to a high pressure hydrothermal reactor to perform a reaction for 13 h at 260° C., pressure was 1.8 MPa, a stirring rate was 250 r/min, then filtration and washing were performed by using pure water, and washing was performed until the conductivity of washing water after washing of the first slurry was ≤500 μS/cm, so as to obtain a washed material.

(3) Sulfuric acid, ammonium sulfate, and CNT were added to the washed material, a molar ratio of sodium in the washed material to the sulfuric acid, ammonium sulfate, and CNT added is 1:0.35:0.15:0.7, then the pure water was added and stirred for slurrying to cause the solid content to be 25%, so as to obtain second slurry.

(4) Spray drying was performed on the second slurry, an inlet air temperature was 150° C., an outlet air temperature was 70° C., a protective gas was used as a gas source to obtain a spray-drying material, a particle size of the spray-drying material was 7 μm, then calcining was performed, during calcining, a heating rate was 1.5° C./min, a temperature was heated to 330° C., a calcining time was 7 h, a cooling rate was 3° C./h, and discharging was performed until a material temperature of the material was cooled to be s 70° C., so as to obtain a calcined material; and airflow pulverization was performed on the obtained calcined material, 0.7 MPa nitrogen was used as gas source for pulverization, pulverization was performed until the particle size of the material was 1.7 μm, then a 100-mesh ultrasonic vibrating screen was used for sieving, iron removal was performed on the sieved material by using an electromagnetic iron remover, and then packaging was performed in a constant temperature and humidity room, with the humidity being ≤10% and the temperature being 25±5° C., so as to obtain the composite sodium ferrous sulfate cathode material.

In this comparative example, a chemical formula of the finally-obtained composite sodium ferrous sulfate cathode material was $Na_{16.6}Fe_{5.5}(PO_4)_{2.3}(SO_4)_{8.3}O_{2.05}/C$.

Comparative Example 2

A method for preparing a composite sodium ferrous sulfate cathode material in this comparative example included the following.

Manganese acetate, ferrous acetate, sodium hydroxide, sodium phosphite, and sodium phosphate were mixed according to a molar ratio being 1:4.5:10.5:0.8:1.5 to obtain a mixture, sulfuric acid, ammonium sulfate, and CNT were added to the mixture, a molar ratio of sodium in the mixture to the sulfuric acid, ammonium sulfate, and CNT added was 1:0.35:0.15:0.7, and stirring and slurrying were performed to cause a solid content to be 25%; then spray drying was performed, an inlet air temperature was 150° C., an outlet air temperature was 70° C., a protective gas was used as a gas source to obtain a spray-drying material, a particle size of the spray-drying material was 7 μm, then calcining was performed, during calcining, a heating rate was 1.5° C./min, a temperature was heated to 330° C., a calcining time was 7 h, a cooling rate was 3° C./min, and discharging was performed until a material temperature of the material was cooled to be s 70° C., so as to obtain a calcined material; and airflow pulverization was performed on the obtained calcined material, 0.7 MPa nitrogen was used as gas source for pulverization, pulverization was performed until the particle size of the material was 1.7 μm, then a 100-mesh ultrasonic vibrating screen was used for sieving, iron removal was performed on the sieved material by using an electromagnetic iron remover, and then packaging was performed in a constant temperature and humidity room, with the humidity being ≤10% and the temperature being 25±5° C., so as to obtain the composite sodium ferrous sulfate cathode material.

II. Test Method

Property Test for Composite Sodium Ferrous Sulfate Cathode Material:

1. An SEM test was performed on the above reaction materials and the composite sodium ferrous sulfate cathode material.
2. The content of Na, Fe, or S was detected by using inductively coupled plasma atomic emission spectrometry.
3. The content of C was tested by using a carbon sulfur analyzer.
4. D10, D50, or D90 was tested by using a laser particle size analyzer.
5. A specific surface area was determined by using a gas adsorption BET method.
6. Powder resistivity was tested by using a four-probe method, and a test pressure was 10 MPa.
7. Pellet Density (PD) was tested by using a PD meter, a test pressure was 3T, and a press time was 30 s.
8. pH and free sodium element test: a method for determining a pH value was referred to GB/T 9724, chemical reagent general rule for the determination of pH; and the content of a free sodium element was determined by using potentiometric titration.
9. A moisture content was tested by using a KF moisture content test method.
10. Ferric iron was measured by using a colorimetric method.
11. A sodium ion diffusion coefficient was obtained through testing using Electrochemical Impedance Spectroscopy (EIS).

2. Property Test for Secondary Battery

Composite sodium ferrous sulfate cathode materials obtained in the embodiments and comparative examples were respectively prepared into cathode plates and applied to a battery, and battery assembly and testing processes were as follows.

1. Preparation of cathode plate: in cathode slurry, a mass ratio of a composite sodium ferrous sulfate cathode material, acetylene black (as a conductive agent), and Polyvinylidene Fluoride (PVDF, as an adhesive) was 88:6:6, and mass was accurate to 0.001 g. The cathode plate used aluminum foil as a current collector. The composite sodium ferrous sulfate cathode material, the acetylene black, the PVDF, and N-methyl-2-pyrrolidone were stirred and slurried to obtain the cathode slurry, the cathode slurry was uniformly coated on the aluminum foil, dried in a 100° C. oven, and then cut into electrode plates with a diameter of 18 mm and a thickness of 0.10 mm, the electrode plates were weighed, and mass was accurate to 0.0001 g. Mixing and coating processes of the cathode slurry were strictly controlled, and tested electrode plates had the same areas and thicknesses.

2. Battery assembly: in an inert gas glove box of which water and oxygen contents were both ≤0.0005%, a metal sodium plate was used as a anode plate, a polypropylene microporous film was used as a diaphragm, and sodium ion battery electrolyte consisting of 1 mol/L sodium perchlorate ($NaClO_4$) and a mixed carbonate-based organic solvent [Ethylene Carbonate (EC)/Diethyl Carbonate (DEC)/Fluoroethylene Carbonate (FEC) (a volume ratio of EC, DEC, and FEC was 1:1:0.05)] was assembled and sealed to form a test battery.

3. Battery test: the test battery was subjected to a charge-discharge cycle at 25° C. on a sodium ion battery electrochemical performance tester (LANHE CT2001A battery test system).

(a) Current charging was performed at 0.1C and 1C rates, and a limited charge voltage was 4.5V.

(b) Current discharging was performed at 0.1C and 1C rates, a discharge cut-off voltage was 2.0V.

III. Test Result Analysis for Embodiments and Comparative Examples

TABLE 1

Physicochemical parameters of cathode material obtained in embodiments and comparative examples

|  | Embodiment 1 | Embodiment 2 | Embodiment 3 | Embodiment 4 | Embodiment 5 | Embodiment 6 | Comparative example 1 | Comparative example 2 |
|---|---|---|---|---|---|---|---|---|
| BET ($m^2$/g) | 4.7 | 3.2 | 5.7 | 4.6 | 4.5 | 4.6 | 4.7 | 4.2 |
| Apparent density (g/mL) | 0.7 | 0.8 | 0.7 | 0.7 | 0.6 | 0.7 | 0.7 | 0.6 |
| Compaction density (g/mL) | 2.2 | 2.3 | 2.2 | 2.2 | 2.2 | 2.2 | 2.2 | 1.9 |
| Powder resistivity ($\Omega \cdot cm$) | 24.7 | 18.1 | 26.9 | 23.9 | 22.1 | 22.6 | 27.9 | 87.5 |
| Free sodium concentration (ppm) | 47.6 | 20.6 | 50.5 | 46.5 | 48.4 | 47.3 | 49.4 | 126.7 |
| Moisture content (ppm) | 356 | 216 | 426 | 389 | 409 | 367 | 412 | 378 |
| Fe3+ concentration (ppm) | 57.6 | 35.7 | 54.6 | 35.7 | 43.7 | 48.5 | 42.5 | 40.8 |
| Sodium ion diffusion coefficient ($cm^2$/s) | $4.7 * 10^{-10}$ | $4.8 * 10^{-10}$ | $2.8 * 10^{-10}$ | $3.1 * 10^{-10}$ | $3.2 * 10^{-10}$ | $2.1 * 10^{-10}$ | $9.6 * 10^{-12}$ | $1.6 * 10^{-11}$ |

Figure 3:
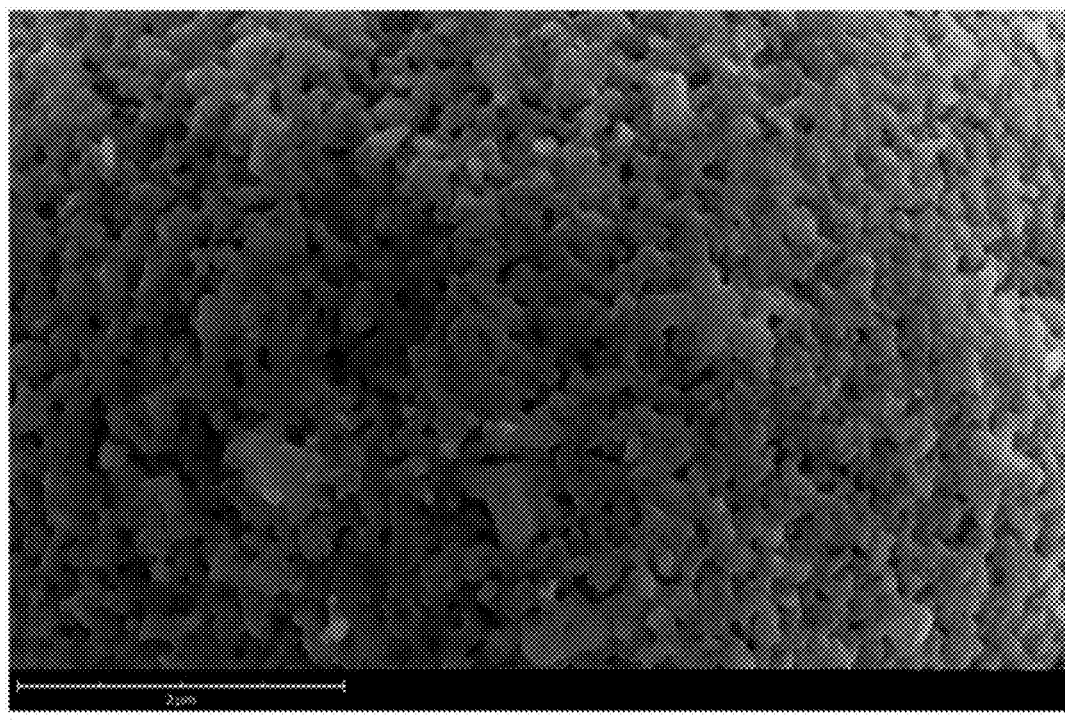
FIG. 3 is an SEM result diagram of a composite sodium ferrous sulfate cathode material obtained according to Embodiment 1 of the present disclosure.

Referring to FIG. 2, the washed material of Embodiment 1 was flaky particles, indicating that the reactive material formed a uniform and stable eutectic material. Referring to FIG. 3, it might be seen from FIG. 3 that, the composite sodium ferrous sulfate cathode material prepared in Embodiment 1 was granular, indicating that carbon coating was realized.

Referring to Table 1, it might be seen from data of Table 1 that, the compaction density of the composite sodium ferrous sulfate cathode material prepared in Embodiment 1 was high, powder internal resistance was low, and pH and free sodium were also low. Compared to Comparative example 1 without introducing a Mn element, the material obtained in Embodiment 1 of the present disclosure was high in sodium ion diffusion coefficient and low in powder resistivity, indicating that the doping of the Mn element was conductive to improvement of electrochemical performance. In Comparative example 2, the composite sodium ferrous sulfate cathode material was directly obtained through mixing and calcining, raw materials did not form a uniform and stable eutectic body, but were directly subjected to spray drying and calcining. Compared with Comparative example 2, the material obtained in Embodiment 1 of the present disclosure was high in sodium ion diffusion coefficient and significantly-low in powder resistivity, facilitating the improvement of electrochemical performance.

TABLE 2

Material performance test results of embodiments and comparative examples

| | Embodiment 1 | Embodiment 2 | Embodiment 3 | Embodiment 4 | Embodiment 5 | Embodiment 6 | Comparative example 1 | Comparative example 2 |
|---|---|---|---|---|---|---|---|---|
| 0.1 C first charging specific capacity mAh/g | 108.5 | 107.9 | 108.1 | 107.5 | 107.6 | 107.2 | 103.2 | 102.8 |
| 0.1 C first discharging specific capacity mAh/g | 102.1 | 101.7 | 102.1 | 101.5 | 101.3 | 100.8 | 99.3 | 96.7 |
| 0.1 C discharging efficiency % | 94.1 | 94.3 | 94.4 | 94.4 | 94.1 | 94.0 | 96.2 | 94.1 |
| 1 C first charging specific capacity mAh/g | 89.1 | 87.6 | 87.4 | 88.1 | 87.2 | 87.6 | 84.3 | 80.4 |
| 1 C first discharging specific capacity mAh/g | 85.5 | 85.1 | 84.2 | 85.1 | 85.3 | 85.2 | 80.1 | 77.3 |
| 1 C discharging efficiency % | 96.0 | 97.1 | 96.3 | 96.6 | 97.8 | 97.3 | 95.0 | 96.1 |
| Capacity retention/% at 1 C after 500 cycles at room temperature | 95.5 | 95.8 | 94.7 | 95.2 | 95.1 | 94.9 | 93.1 | 93.2 |

Figure 4:
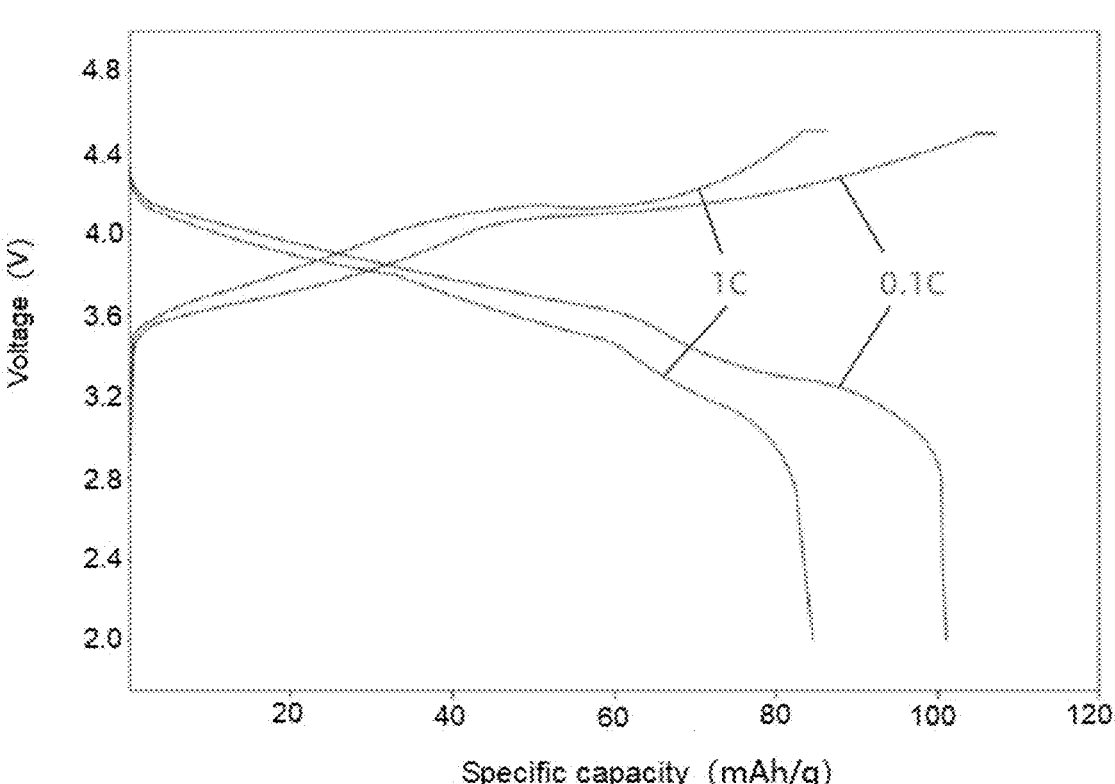
FIG. 4 is a charging curve and a discharging curve of a composite sodium ferrous sulfate cathode material obtained at a 0.1C rate and a 1C rate according to Embodiment 1 of the present disclosure.

FIG. 4 was charging and discharging curves of the composite sodium ferrous sulfate cathode material obtained at a 0.1C rate and a 1C rate in Embodiment 1 of the present disclosure. In combination with Table 2 and FIG. 4, it might be seen that, compared to Comparative examples 1 and 2, the composite sodium ferrous sulfate cathode materials prepared in Embodiments 1-6 were high in capacity, and excellent in electrical properties such as rate performance and cycling performance. Compared to composite sodium ferrous sulfate cathode materials prepared in the comparative examples, the composite sodium ferrous sulfate cathode materials prepared in the present disclosure was more excellent in electrical performance, and was more excellent in cycling performance compared to pure phase sodium ferrous sulfate and sodium ferrous sulfate prepared by conventional processes.

What is claimed is:

1. A composite sodium ferrous sulfate cathode material, comprising a core, wherein a chemical formula of the core is $Na_xM_yFe_z(PO4)_k(SO_4)_{(0.4-0.6)x}O_t$, M comprises at least one of manganese, vanadium, or titanium, $16 \leq x \leq 17$, $y=1$, $4 \leq z \leq 5$, $2 \leq k \leq 2.6$, and $y+z-0.1x-1.5k \leq t \leq y+z+0.1x-1.5k$.

2. The composite sodium ferrous sulfate cathode material according to claim 1, further comprising a carbon coating layer, wherein the carbon coating layer coats a surface of the core, and a molar ratio of a carbon element in the carbon coating layer to a sodium element in the core is greater than or equal to 0.5 and less than or equal to 1.

3. The composite sodium ferrous sulfate cathode material according to claim 1, wherein a sodium ion diffusion coefficient of the composite sodium ferrous sulfate cathode material is $1*10^{-10}$ cm²/s-$5*10^{-10}$ cm²/s; and the powder resistivity of the composite sodium ferrous sulfate cathode material is 15 Ω·cm-25 Ω·cm.

4. A method for preparing a composite sodium ferrous sulfate cathode material, comprising the following steps:

mixing a ferrous iron source, a sodium source, a phosphorus source, a dopant, a reducing agent, and a first solvent to obtain a first slurry;

performing a hydrothermal reaction on the first slurry, and then performing filtration and washing to obtain a washed material;

mixing the washed material, a sulfate compound, a carbon source, and a second solvent to obtain a second slurry; and drying and calcining the second slurry, and then performing pulverization and impurity removal to obtain a composite sodium ferrous sulfate cathode material.

5. The method for preparing a composite sodium ferrous sulfate cathode material according to claim 4, wherein in the first slurry, the dopant comprises a doped element, and a molar ratio of the doped element to an iron element, a sodium element, and a phosphorus element is 1:(4-5):(16.0-17.0):(2-2.6); and/or a molar ratio of an iron element in the ferrous iron source to the reducing agent is 1:(0.1-0.3); and/or a solid content of the first slurry is 25%-35%; and/or a molar ratio of a sodium element in the washed material to the carbon source is 1:(0.5-1); and/or a solid content of the second slurry is 20%-30%.

6. The method for preparing a composite sodium ferrous sulfate cathode material according to claim 4, wherein the ferrous iron source comprises at least one of ferrous acetate or ferrous phosphate; and/or the sodium source comprises at least one of sodium hydroxide, sodium oxide, sodium carbonate, sodium acetate, or sodium phosphate; and/or the phosphorus source comprises sodium phosphate; and/or the reducing agent comprises sodium phosphite; and/or the dopant comprises at least one of a manganese source, a vanadium source, or a titanium source; and/or the carbon source comprises at least one of graphene or a carbon nanotube; and/or the sulfate compound comprises sulfuric acid and ammonium sulphate;

in the second slurry, a molar ratio of a sodium element in the washed material to the sulfuric acid is 1:(0.3-0.4); and/or a molar ratio of the sodium element in the washed material to the ammonium sulphate is 1:(0.1-0.2).

7. The method for preparing a composite sodium ferrous sulfate cathode material according to claim 4, wherein a temperature of the hydrothermal reaction is 200° C.-300° C., a time for the hydrothermal reaction is 12 h-15 h, and pressure of the hydrothermal reaction is 1.5 MPa-2 MPa.

8. The method for preparing a composite sodium ferrous sulfate cathode material according to claim 4, wherein the hydrothermal reaction is performed while stirring, and a stirring speed is 200 r/min-300 r/min.

9. The method for preparing a composite sodium ferrous sulfate cathode material according to claim 4, wherein in the step of drying and calcining the second slurry, a calcining temperature is 300° C.-350° C., a calcining time is 4 h-8 h, and calcining is performed under a protective atmosphere.

10. The method for preparing a composite sodium ferrous sulfate cathode material according to claim 4, wherein in the calcining process, a heating rate is 1° C./min-2° C./min, and a cooling rate is 2° C./min-4° C./min.

11. The method for preparing a composite sodium ferrous sulfate cathode material according to claim 4, wherein spray drying is used for drying, an inlet air temperature for spray drying is 150° C.-350° C., and an outlet air temperature is 70° C.-95° C.

12. The method for preparing a composite sodium ferrous sulfate cathode material according to claim 4, wherein airflow pulverization is used for pulverization, a protective gas is used as a gas source for pulverization, and an air pressure is 0.5 MPa-0.8 MPa.

13. A cathode plate, comprising the composite sodium ferrous sulfate cathode material according to claim 1.

14. A secondary battery, comprising the cathode plate according to claim 13.

15. The composite sodium ferrous sulfate cathode material according to claim 2, a mass fraction of the carbon coating layer in the composite sodium ferrous sulfate cathode material is 5% to 10%.

16. The composite sodium ferrous sulfate cathode material according to claim 1, the chemical formula of the composite sodium ferrous sulfate cathode material is $Na_{16.6}MnFe_{4.5}(PO_4)_{2.3}(SO_4)_{8.3}O_{2.05}/C$, $Na_{16}MnFe_4(PO_4)_2(SO_4)_{6.4}O_{3.6}/C$, $Na_{17}MnFe_5(PO_4)_{2.6}(SO_4)_{9.35}O_{0.85}/C$, $Na_{16.6}VFe_{4.5}(PO_4)_{2.3}(SO_4)_{8.3}O_{2.05}/C$, or $Na_{16.6}TiFe_{4.5}(PO_4)_{2.3}(SO_4)_{8.3}O_{3.05}/C$.

\* \* \* \* \*